H. J. WICKMAN & L. G. WATKINS.
FISH STRINGER.
APPLICATION FILED AUG. 18, 1910.
1,004,324.
Patented Sept. 26, 1911.
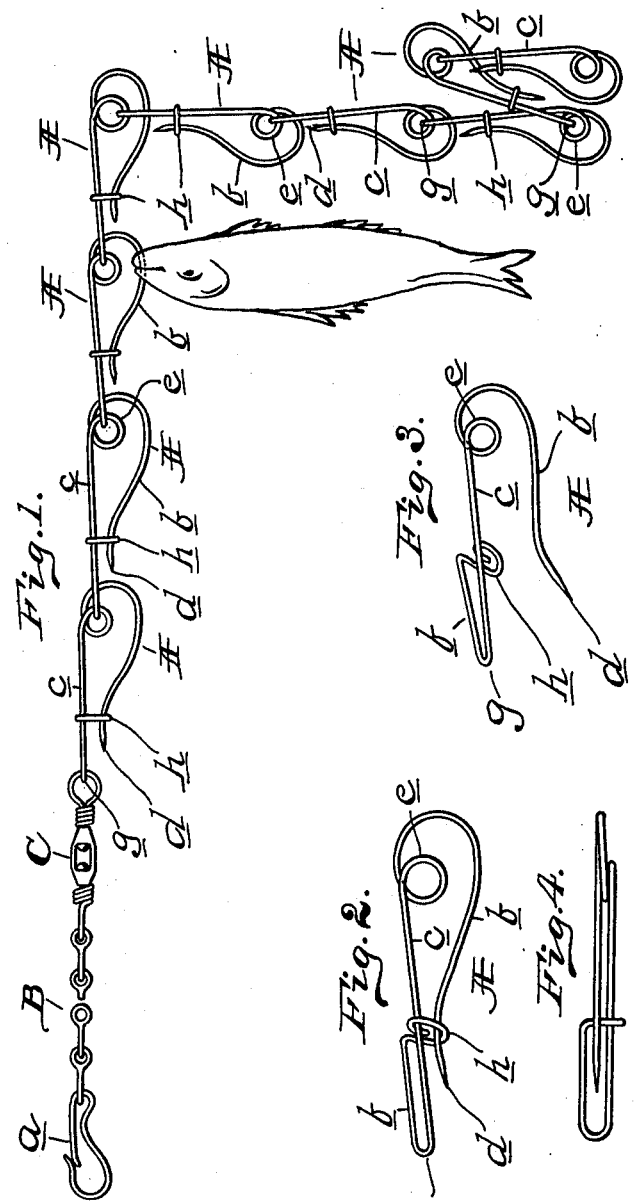
Witnesses
A. M. Dow.
C. R. Stickney.
Inventors,
Henry J. Wickman
Louis G. Watkins
By Barthel & Lauther
Attorneys

UNITED STATES PATENT OFFICE.

HENRY J. WICKMAN AND LOUIS G. WATKINS, OF HOWELL, MICHIGAN; SAID WICKMAN ASSIGNOR TO SAID WATKINS.

FISH-STRINGER.

1,004,324.　　　　　Specification of Letters Patent.　　Patented Sept. 26, 1911.

Application filed August 18, 1910. Serial No. 577,753.

*To all whom it may concern:*

Be it known that we, HENRY J. WICKMAN and LOUIS G. WATKINS, citizens of the United States of America, residing at Howell, in the county of Livingston and State of Michigan, have invented certain new and useful Improvements in Fish-Stringers, of which the following is a specification, reference being had therein to the accompanying drawings.

This invention relates to a fish stringer especially devised for anglers to keep their catch in the water while fishing from a boat and it consists of a chain embodying a series of wire links each of which is adapted to be hooked through the mouth of a fish all as more fully hereinafter described and shown in the accompanying drawings, in which—

Figure 1 is an elevation of an improved fish stringer, Fig. 2 is a detached perspective of one of the wire links adapted to hold a fish. Fig. 3 is another perspective of such a link showing the latches thereof opened and Fig. 4 is an edge elevation of such a link.

Referring to the drawings A represents the fish holding links of which the chain is formed and B represents a piece of ordinary link chain which is of suitable length to allow the part formed of the links A to be paid out into the water from a boat, and for convenience of fastening it to the boat it may be provided with a spring hook *a* or other suitable means. The fish holding links of the chain are formed of spring wire substantially as shown in the drawing, each link formed of a single piece of wire bent upon itself to form a hook *b* at the end of a shank *c* the hook being provided with a sharpened end *d*. A coil *e* is formed in the shank at the base of the hook and the opposite end is formed with a return bend *f* in a plane at right angles to the coil and forming a hook *g* on the end of the shank. The end of this return bend is formed into a double loop in a plane at right angles to the return bend and forming two keepers *h*, *i*, the former adapted to latch the point of the hook *b* and the other to latch the return bend to the shank. As shown in Fig. 3 the return bend *f* and hook *b* form normally open spring latches and to connect the links together into a chain of any desired length the return bend *f* of one link is engaged into the coil *e* of a preceding link and then its keepers are engaged with the shank and with the point of the hook.

The fish stringer constructed as shown and described forms a very simple and useful addition to the equipment of the angler, it does not catch the weeds in rowing and it enables him to keep the fish much longer alive since by passing the hook through the mouth, the fish cannot drown as they will if strung by the gills. The chain can also be very compactly folded up or if desired the links can be carried separate and the chain made up as the need arises.

What we claim as our invention is:—

1. A fish stringer composed of wire links forming a chain, each link consisting of a single piece of spring wire formed into a hook, the hook portion being sharpened at the end and the shank portion being provided at its base with a coil in the plane of the hook and at its opposite end with a return bend forming a hook in a plane at right angles to that of the coil and engaging with the coil of the adjacent link, the end of the return bend being bent into a double loop in a plane at right angles thereto and forming two keepers one for latching the return bend to the shank and the other for latching the sharpened end of the hook thereto.

2. In a fish stringer, a series of chain links each formed from a single piece of spring wire and comprising a hook consisting of a shank portion having a coiled eye at one end thereof in the plane of the hook and a hook portion connected with the shank by a curve forming an enlarged continuation of the coil forming the eye and extending beyond it, and a return bend formed at the other end of the shank and flexing in a plane at right angles to that in which the hook portion flexes, said return bend terminating at its free end into two keepers, adapted to latch the return bend and the hook portion to the shank.

In testimony whereof we affix our signatures in presence of two witnesses.

HENRY J. WICKMAN.
LOUIS G. WATKINS.

Witnesses:
A. D. THOMPSON,
A. A. MONTAGUE.

Copies of this patent may be obtained for five cents each, by addressing the "Commissioner of Patents, Washington, D. C."